Figure 1:
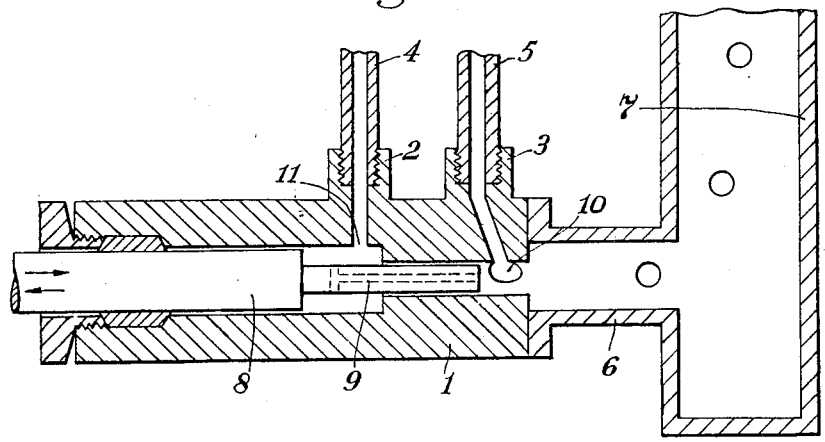

Sept. 4, 1951  H. M. HUTCHINSON ET AL  2,566,567
PRODUCTION OF POLYSTYRENE BEADS
Filed May 14, 1946  2 Sheets-Sheet 1

Henry Malcolm Hutchinson Inventors
and Johann Josef Peter Staudinger
By
Ward Crosby & Neal
Attorneys Sept. 4, 1951 H. M. HUTCHINSON ET AL 2,566,567
PRODUCTION OF POLYSTYRENE BEADS
Filed May 14, 1946 2 Sheets-Sheet 2

Henry Malcolm Hutchinson Inventor
and Johann Josef Peter Staudinger
By
Ward Croty & Neal
Attorneys Patented Sept. 4, 1951

2,566,567

UNITED STATES PATENT OFFICE 2,566,567

PRODUCTION OF POLYSTYRENE BEADS

Henry Malcolm Hutchinson, Banstead, and Johann Josef Peter Staudinger, Ewell, England, assignors to The Distillers Company, Limited, Edinburgh, Scotland, a British company Application May 14, 1946, Serial No. 669,528
In Great Britain March 20, 1946

11 Claims. (Cl. 260—93.5)

This invention is concerned with the production of polymerisation products of styrene and the nuclear substitution products thereof, and in particular relates to the physical form in which the products are obtained.

The usual procedure for the production of polystyrene and the like compounds in a form suitable for supply to manufacturers of articles therefrom is to polymerise the monomer in mass or bulk form, and then to grind and crush the block of polymer to a more or less coarse powder. It is also known to polymerise styrene in the form of an emulsion in an aqueous phase. The polymer prepared in the latter way is in the form of an extremely fine powder, which has to be consolidated by melting, compressing or tabletting to bring it into a form suitable for use in the various known fabrication and manipulation techniques.

To overcome certain disadvantages of the above processes, it has been proposed to polymerise styrene in the form of a coarse suspension in water, maintaining the styrene phase in a sub-divided form during the polymerisation by mechanical agitation. However, this so-called "bead" or "pearl" polymerisation has in turn many disadvantages even when working on the laboratory scale and the translation of this process from the small laboratory scale to production scale accentuates these difficulties considerably. For example, although the product is obtained in the form of beads, their size varies very widely with the largest beads as much as fifty times the size of the smallest and with the smaller beads predominating; furthermore, it is particularly difficult to obtain beads of uniform size, when beads of more than 1 mm. diameter are desired. Moreover, as the desired diameter of the beads increases, the control of the process, as far as the maintenance of the globule diameter is concerned, becomes more difficult. This is to some extent connected with the fact that styrene and styrene derivatives pass, during the course of their polymerisation, through a "tacky" or "sticky" stage when the tendency of particles thereof to coalesce is very pronounced and a subsequent disruption or separation of coalesced particles is difficult. This "tacky" or "sticky" stage is absent, or is very much less pronounced in the polymerisation of other vinyl compounds such as the vinyl esters and the acrylic ester type of compound. A further disadvantage is due to the fact that the globules of monomer are saturated with water and consequently at the end of the polymerisation process a considerable amount of water is occluded in the polymer beads. Furthermore, a still more detrimental effect results in cases where the globules are maintained in suspension by a stirring or similar agitating device for there is a marked tendency for droplets of the suspending medium to become embedded in the sticky or tacky partly-polymerised material and to remain there and become incorporated in the final polymer, thus, rendering the end product quite unfit for use.

Among the objects of this invention are the overcoming of the difficulties and disadvantages of these known processes and the provision of an improved process giving improved products and of apparatus for use in such process.

The invention accordingly comprises the novel processes and steps of processes, specific embodiments of which are described hereinafter by way of example and in accordance with which I now prefer to practice the invention.

According to the present invention there is provided a process for the production of polymers of styrene and styrene compounds in the form of substantially uniform sized discrete beads or globules which comprises introducing a viscous liquid mixture of a monomer and a polymer of styrene and/or a nuclear-substituted styrene containing at least 40% by weight of the polymer, in discrete portions of substantially uniform size into a heated inert liquid medium with which the monomer is not miscible and in which the polymer is not soluble and maintaining said discrete portions in suspension in said heated medium at least until substantially complete polymerisation of the monomer has occurred.

The nuclear-substituted styrenes are preferably the alkyl and halogen-substituted compounds of which there may be mentioned p-methyl-styrene, o-methyl-styrene, p-chloro-styrene, o-chloro-styrene, and the dinuclear-substituted dimethyl and dichloro-styrenes. The said styrene and styrene compounds may be polymerised in admixture with other polymerisable ethenoid compounds, such as acrylic and methacrylic acid derivatives, methyl vinyl ketone, divinyl benzene, vinyl crotonate and the like. If desired, small amounts of a plasticiser, filler or dyestuff may be mixed with the monomeric compounds provided that they are not soluble in the inert liquid medium in which the mixture of monomer and polymer is later treated. In this way it is possible to produce coloured and plasticised polymers and copolymers without any additional processing.

The mixture of monomer and polymer may be prepared by mixing the polymer with or dissolving it in the monomer but it is preferably prepared by partially polymerising the monomer to the desired extent. The partial polymerisation may be carried out either as a batch or continuous process, and may be effected by the action of heat or a polymerisation catalyst or by exposure to actinic light or by any combination thereof. We prefer, however, to effect the partial polymerisation by heating the monomer in the presence of a catalyst, such as benzoyl peroxide or m-toluyl peroxide, at a temperature of from 50° to 130° C. for a period of 2 to 10 hours, according to the concentration and nature of the catalyst employed and according to the molecular weight of the polymer which is desired. These conditions are maintained until preferably between 50% and 80% of the monomer has been converted to the polymer. The preferred overall rate of polymerisation during the initial partial polymerisation stage should not be less than 4% per hour, and rates of 6% to 15% per hour are particularly suitable. The rates of polymerisation are a function of the temperature and the nature and concentration of the catalyst, which in turn, determine the degree of polymerisation ($\overline{P}$) of the polymer produced. The preferred value of $\overline{P}$ lies above 300, and those versed in the art can arrive readily at a combination of temperature and catalyst concentration, which will give the desired product at the desired rate. When a temperature towards the upper limit of the above-quoted range is used in the initial partial polymerisation stage, it is advisable to use superatmospheric pressures in the final polymerisation stage in those cases where the heated inert liquid medium comprises water as the monomer contained in the partially-polymerised portions may otherwise form an azeotropic mixture with water boiling, at normal pressure, below that temperature, causing loss of monomer as well as surface defects on the beads of the final product.

The mixture of polymer and monomer is introduced into the heated inert liquid medium in the form of discrete portions which may be produced in any convenient manner, for example, by mechanical means such as by simply cutting, at a controlled rate, an extruded stream of the viscous liquid mixture into pieces whose length is approximately equal to the diameter of the stream. The pieces, which shortly after cutting may not have assumed a spherical shape, will in the course of the subsequent polymerisation treatment form themselves into globules and spherical shapes of great uniformity. From the point of view of satisfactory output from each beading device, we prefer to form beads of not less than 1 mm. diameter, and preferably of 1.5 to 8 mm. diameter. The temperature of the liquid medium may be the same as that of the pre-polymerisation, (i. e. within the range of 50°-130° C.), but it may also be lower or higher according to the rate of polymerisation which is desired during the final stage of completion of the polymerisation. A lower temperature may be used in this final stage where the temperature used in the initial stage is such that there is a danger of vapourisation of the monomer or where, as already mentioned, there is the possibility of an azeotropic mixture being formed with water and in this way the use of superatmospheric pressures may be avoided.

For the purpose of carrying this invention into effect, it is immaterial what means are used to sub-divide the partially polymerised product into beads. Various mechanical devices have been tried and found useful, some of which are shown in the attached diagrammatic drawings.

Other means of carrying out the sub-division of the partially polymerised product will be apparent to those acquainted with polymerisation reactions and with the consistency and other physical properties of the products undergoing polymerisation.

The final stage of polymerisation is effected by keeping the individual portions of partially polymerised product suspended in the heated liquid medium either by gentle agitation or by flowing the liquid medium in co-current or countercurrent with the suspended product, through a tower or system of towers or through coils at a rate commensurate with the time required for the completion of polymerisation. The preferred time for the completion of polymerisation is between 1 hour and 8 hours at the temperatures previously mentioned.

The heated inert liquid medium in which the polymerisation reaction is to be substantially completed may be, for example, water, glycol, glycerol or mixtures of these.

The density of the liquid medium can be modified in such a way that the individual portions undergoing completion of polymerisation, either rise or fall at a rate which will result in a time of immersion necessary for the completion of polymerisation. This can be done by adding, to the liquid medium, suitable water-soluble compounds, such as calcium chloride, sodium silicate, sorbitol and sugar. The time spent by the individual portions in passing through the heated liquid medium may be increased if desired, by increasing the viscosity of the medium by the addition of soluble colloidal substances or thickeners such as starch, alginates, methyl cellulose carboxylate, methyl cellulose, cellulose hydroxy-ethyl ether, polyvinyl alcohol, polyethylene oxide and polyvinyl methyl ether.

The liquid medium, whatever its composition, should preferably have a viscosity of not less than 10 centipoises at the temperature at which the completion of polymerisation is carried out. The specific gravity of the liquid medium can be arranged to be either greater or less than the specific gravity of the polymerised material according to whether it is desired that the individual portions should rise or fall in the liquid medium. Alternatively, the liquid medium and the individual portions may be of approximately the same specific gravity, the individual portions then being carried through the system by the circulation of the liquid.

The substantially fully polymerised beads or globules are separated from the liquid medium by any of the conventional methods, such as screening, sedimentation or centrifuging and are then washed and dried. Where the liquid medium comprises water, the spent wash-water, containing some of the ingredients of the suspension medium may be reconcentrated and returned for use in the process.

The discrete individual polymer beads or globules prepared in this way are particularly suitable for injection moulding or extrusion as they flow through hopper devices in a regular and accurate manner.

In the following examples, which illustrate methods of carrying out the present invention, the degree of polymerisation is arrived at from viscometric data obtained from 4 grm. per litre solutions of the polymers in benzene and the percentage figures quoted are calculated on a weight by volume basis unless otherwise stated.

*Example 1.*—A mixture of 9,000 parts by weight of pure monomeric styrene and 36 parts by weight of benzoyl peroxide were heated in a stainless steel vessel to 80°±0.5° C. and maintained at this temperature for 7 hours. A mixture of approximately 68% polymeric styrene and 32% monomeric styrene was obtained which was cooled to room temperature. This highly viscous mixture was then fed to a cutting device by applying pressure to the polymerisation vessel. The cutter was attached to the bottom of a jacketed tube containing a liquid suspension medium through which the pieces cut off were allowed to rise. The suspension medium in this column was an aqueous solution of 20% sucrose and 4% sodium alginate which was kept at 90°±1° C. The passage of the cut off pieces through the column was adjusted in such a way that they required approximately 3 hours to reach the top of the column. In the course of this time the individual pieces assume a spherical form of substantially completely polymerised styrene. The beads were removed from the top of the column and freed from adherent liquid by centrifuging, the separated liquid being returned to the column. The beads were then washed with warm water followed by a final wash with distilled or demineralised water, and were subsequently dried in a current of warm dust-free air at a temperature of 60°-70° C. The product which is in the form of uniform spheres of 6 to 6.5 mm. diameter has a molecular weight corresponding to an average chain length of 1,000 styrene units.

When these spheres were charged into an injection moulding machine, they showed an easy and uniform flow through the hopper gate. Furthermore, the piston of the injection moulding machine remains clean and free from polymer owing to the absence of fine polymer dust. The same experiment was repeated, adding to the initial mixture of 9,000 parts of styrene and 36 parts of benzoyl peroxide, 1 part of a blue dyestuff. Prepolymerisation, bead cutting and polymerisation to completion was carried out as above, the solid polystyrene beads being uniformly dyed.

*Example 2.*—Monomeric styrene, containing 0.33% by weight of m-toluyl peroxide, was pumped through a jacketed stainless steel tube of 1 inch internal diameter at a rate corresponding to a time of residence of seven hours and the temperature in the tube was maintained at 80° C. by circulating hot oil through the jacket so that a partially polymerised mixture consisting of approximately 70% polymer and 30% monomer was obtained. This mixture was fed from the stainless steel coil to a cutting device, and cut into fragments of 0.2 g. weight, which were allowed to fall into the top of a column filled with an aqueous solution of 0.5% of polyvinyl alcohol kept at 90°±0.5° C. The density of this mixture of partially polymerised product and monomer is higher than that of the polyvinyl alcohol solution and the fragments sink slowly through the column. During the passage through the column, the fragments assumed a spherical form and became completely polymerised. The rate of fall was controlled by the viscosity of the suspension liquid as well as by circulating it through the column in counter-current to the falling beads. By these means, the time of passage was adjusted so as to ensure complete polymerisation. In this case the time required was three hours. The polymerised beads were removed from the bottom of the column by an archimedean screw lift, and were subsequently washed and dried as described in Example 1.

The product of the above process is in the form of uniform spheres of approximately 7 mm. diameter. The polymer thus obtained has a molecular weight corresponding to a chain length of 1,000 styrene units.

When carrying out this experiment with monomeric styrene containing 0.5% by weight of m-toluyl peroxide and 0.1% liquid paraffin, the partial polymerisation proceeds to approximately 80% requiring subsequently 2½ hours for the completion of the polymerisation in the aqueous polyvinyl alcohol solution. By speeding up the operation of the cutting device, beads of approximately 4 mm. diameter were obtained. The washed and dried beads were extremely suitable for feeding into an injection moulding machine.

*Example 3.*—Monomeric styrene, containing 0.33% by weight of m-toluyl peroxide, was partially polymerised in the manner given in Example 2, resulting in a viscous mixture containing approximately 70% polymer and 30% monomer. This mixture was cooled down to room temperature as it left the polymerising tube, and was fed into a masticator where 0.2% of ethylene glycol di-methacrylate was incorporated, in the absence of air or gas in order to avoid the formation of bubbles in the mixture. This composition was then fed to the cutting device and cut into fragments of approximately 0.5 g. weight which were discharged immediately into a suspension medium consisting of an aqueous solution containing 20% of invert sugar, and 2% of polyvinyl alcohol in a column at the bottom of which the cutter was situated. The temperature of the suspension medium was kept at 90°±0.5° C. the rate of rise of the beads being adjusted to give a time of passage through the column of two hours by circulating the suspension medium in countercurrent to the rising beads. At the end of this period the beads still contained a small percentage of monomer. The polymerisation was brought to completion by heating the beads at 100° C. under 20 lbs. per square inch pressure using the same suspension medium. This step was carried out in a closed vessel fitted with a slow speed stirrer. After one hour, polymerisation was completed, and the beads were washed and dried by the method described in Example 1.

*Example 4.*—A mixture of 2.0 parts by weight of m-toluyl peroxide and 1085 parts by weight of p-chlorostyrene was polymerised to a highly viscous mixture containing approximately 60% of polymer by heating to 75° C. for 6 hours. The mixture was cut into pieces of 0.5 g. weight in the manner given in Example 1 and the fragments fed into the bottom of a column filled with a 2% aqueous solution of polyvinyl alcohol maintained at a temperature of 75° C. The beads had a density higher than that of the aqueous solution, and were carried up the column by circulating the aqueous solution at such a rate that the time of passage was between 2½ and 3 hours, at the end of which period they were polymerized completely. The beads were washed and dried as described in Example 1. The beads had a diameter of approximately 9.2 mm. and a molecular weight corresponding to an average chain length of approximately 1100 p-chloro-styrene units.

*Example 5.*—A mixture of 50 volumes of methyl methacrylate and 50 volumes of styrene was catalysed with 2 grams per litre of benzoyl peroxide and polymerised to a thick syrup by heating at 75° C. for 9 hours. This partially-polymerised mixture was cooled to 15°–25° C. and cut into uniform fragments which were allowed to float up a column filled with a viscous aqueous solution of 2% polyvinyl alcohol and 5% glucose maintained at 75° C. The time of residence in the column was 3 hours, at the end of which period the spheres were completely polymerised. They were then removed, washed and dried in the manner described in Example 1.

It will be evident from the preceding statements, including those appearing in the examples, that the rate of polymerisation in accordance with applicants' process is in the range of about 2.5 to 60% per hour.

Figure 2:
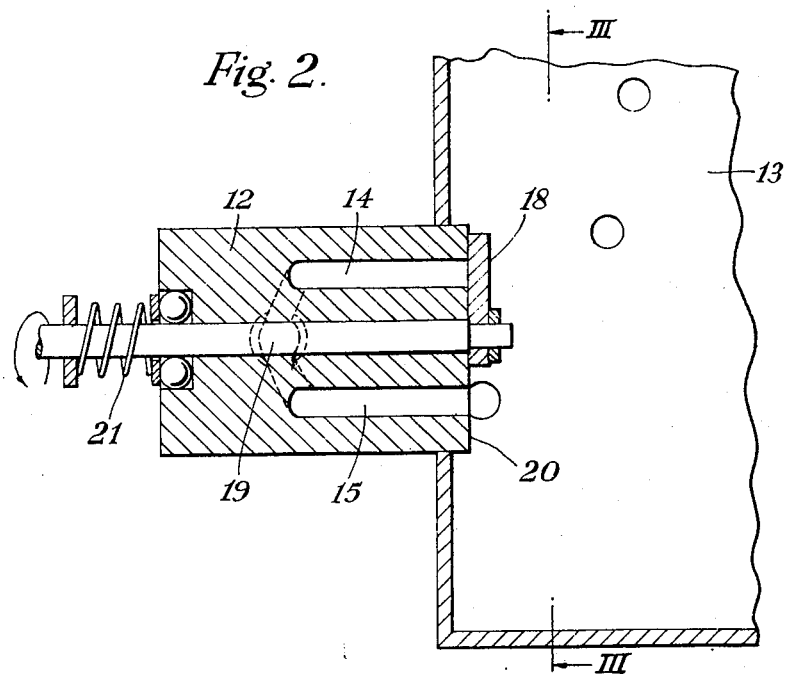
Figure 3:
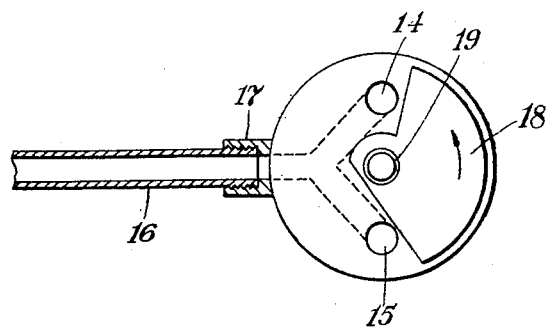
Figure 4:
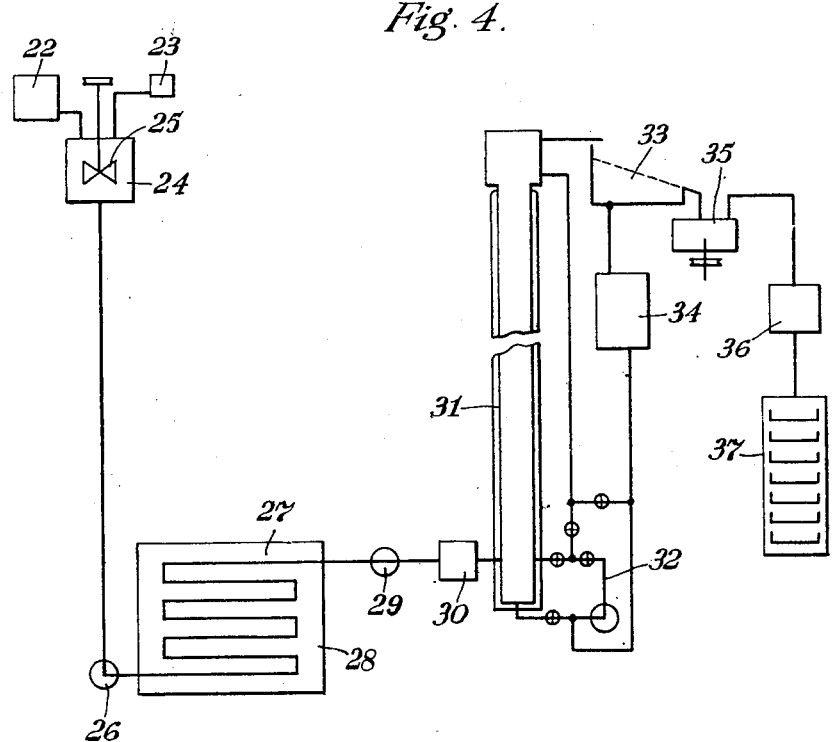

In the accompanying diagrammatic drawings illustrating various cutting devices for use in the process of this invention, Figure 1 is a side sectional elevation of one embodiment of a cutting device, Figure 2 is a side sectional elevation of a second embodiment of a cutting device, Figure 3 is an end view on the line III—III of Figure 2 and Figure 4 is a diagrammatic representation of one embodiment of apparatus, embodying a cutting device, for use in carrying out the process of the invention.

In the device shown in Figure 1, a hollow cylinder 1 is provided with joints 2 and 3 into which pipes 4 and 5 are screwed, which supply the liquid suspension medium and the partially polymerised mixture respectively. The cylinder 1 is attached by means of a tube 6 to a tower 7, which is full of the liquid suspension medium, suitable means (not shown) being provided for heating the liquid and maintaining its circulation through the system. In the interior of the cylinder 1 a piston 8 is caused to reciprocate by means not shown and in its movement to open and close the port 10 leading from the pipe 5, supplying the partially polmerised mixture, to the interior of the cylinder 1. The pipe 4 conveying liquid suspension medium is also connected to the interior of the cylinder by a port 11, which is situated on the side of the port 10 remote from the tower 7, containing the hot liquid. In order to provide free passage for the liquid suspension medium from the pipe 4 to the tower 7, the piston is provided with grooves or channels 9. It will be seen that as the piston moves to and fro in the cylinder, it alternately opens and closes the port 10 and the timing of the motion is arranged so that the port is open for sufficient time to allow a globule of the desired size of partially polymerised mixture to issue before being cut off by the next movement of the piston. In the apparatus shown the specific gravity of the suspension medium is arranged so that the globules rise in the tower. The viscosity and temperature of the liquid and the height of the tower are arranged so that by the time the globules reach the top of the tower at least 95% polymerisation has been effected. The beads so obtained are removed from the top of the tower in any convenient way.

The devices illustrated in Figures 2 and 3 consist of a cylinder 12 bolted to a tower 13 containing the liquid suspension medium. In the cylinder, passages 14 and 15 are provided to which partially polymerized mixture is continuously supplied by means of the pipe 16 screwed into the cylinder 12 at the joint 17. A knife blade 18 mounted on a shaft 19 and kept pressed against the face 20 of the cylinder by means of a spring 21, is rotated as shown, its shape being such that it only covers the orifice of one of the passages 14 and 15 at a time. It will be seen that as the knife 18 rotates, it cuts off the partially polymerised mixture extruding from the orifices of 14 and 15 alternately. The speed of rotation of the knife and the rate of supply of the mixture are arranged so that globules of the desired size are cut off by the knife. In this case, also, suitable means for circulating the liquid suspension medium may be provided.

The arrangement shown in Figure 4 shows vessels 22 and 23 which supply monomer and catalyst respectively to a mixing vessel 24 provided with a stirring device 25 and cooling means (not shown) for example, an internal water coil. A pump 26 delivers the monomer and catalyst mixture to a tube polymerisation unit 27, comprising, for example, a stainless steel tube of 1 inch diameter in which partial polymerisation occurs, the tube being jacketed as indicated by the reference 28 which jacket is provided with heating means (not shown). A pump 29 whose delivery rate is made approximately equal to that of the pump 26 delivers the partially-polymerised product to the cutting device 30 which delivers the cut pieces to the foot of the jacketed column 31, which is provided with pipe lines, valves and pump generally indicated at 32 to enable the liquid in the column to be circulated at a controlled rate in either direction at will. In the arrangement shown, the beads rise in the column 31 and float off at the top to a screening device 33 from which liquid is led to the liquid collecting tank 34 and the polymerised beads to a centrifuge 35 from which they are transferred to a washing tank 36 and a tray drier 37.

The cutting devices and the polymerisation apparatus also form part of the invention and it will be appreciated that various modifications may be made in the specific details of the cutting devices and apparatus shown without departing from the scope of the invention.

What we claim is:

1. A process for the production of polymer in bead form which comprises forming and separating individual discrete substantially uniformly sized beads from a partially polymerised viscous liquid mixture selected from the group consisting of styrene and nuclear-alkyl- and nuclear-halogen-substituted styrenes containing at least 40% by weight of the polymer, introducing such beads into a heated inert liquid medium, having a viscosity of not less than 10 centipoises at the polymerisation temperature, and with which inert liquid medium the beads are substantially immiscible, substantially completely polymerising the mixture in the form of such uniformly sized beads while the beads are suspended in the liquid, the rate of polymerisation being in the range 2.5% to 60% per hour, and recovering such polymerised beads.

2. A process according to claim 1, wherein said heated inert liquid medium is contained in a substantially vertical reaction system, and the discrete substantially uniformly sized beads are maintained in suspension in said heated inert liquid medium by flowing said medium through the reaction system in the direction opposite to the direction said beads flow in said medium, at a rate commensurate with the time required for the completion of polymerisation.

3. A process as set forth in claim 1, wherein said partial and complete polymerisation is effected by the action of a polymerisation catalyst at a temperature of from 50° to 130° C.

4. A process as set forth in claim 3, wherein partial polymerisation is effected under conditions such that the rate of polymerisation is in a range of 8 to 15% per hour.

5. A process as set forth in claim 1, wherein said viscous liquid mixture contains from 50 to 80% by weight of said polymeric material.

6. A process as set forth in claim 1, wherein said polymeric material in said viscous liquid has a degree of polymerisation $\bar{P}$ above 300.

7. A process as set forth in claim 1, wherein the partially polymerised material is heated in a viscous inert liquid medium in which it is suspended for a period of the order of 1 to 8 hours at a temperature of the order of 50 to 130° C.

8. A process in accordance with claim 7 in which the size of the beads is approximately 1.5 to 8 mm. in diameter.

9. A process as set forth in claim 1, wherein said viscous liquid mixture is continuously introduced into said medium in discrete portions of substantially uniform size.

10. A process as set forth in claim 9, wherein said discrete portions are formed by cutting an extruded stream of said viscous liquid mixture into pieces whose length is approximately equal to the diameter of said stream.

11. A process as set forth in claim 1, wherein the discrete portions are maintained in suspension in said heated liquid medium by adjusting the density thereof to a value such that said discrete portions move through the still liquid at a rate which results in a time of immersion necessary for substantially complete polymerisation.

HENRY MALCOLM HUTCHINSON.
JOHANN JOSEF PETER STAUDINGER.

REFERENCES CITED

The following references are of record in the file of this patent:

UNITED STATES PATENTS

| Number | Name | Date |
|---|---|---|
| 2,256,160 | Britton | Sept. 16, 1941 |
| 2,294,226 | D'Alelio | Aug. 25, 1942 |
| 2,326,326 | Breedis | Aug. 10, 1943 |